United States Patent [19]

Watkins

[11] Patent Number: 5,789,893

[45] Date of Patent: Aug. 4, 1998

[54] ANGLE FIRING CONTROLLER AND METHOD OF CONTROLLING A SWITCHED RELUCTANCE MACHINE

[75] Inventor: Stephen J. Watkins, Leeds, Great Britain

[73] Assignee: Switched Reluctance Drives, Ltd., Harrogate, United Kingdom

[21] Appl. No.: 486,937

[22] Filed: Jun. 7, 1995

[30] Foreign Application Priority Data

Apr. 3, 1995 [GB] United Kingdom .................. 9506975

[51] Int. Cl.$^6$ ........................................................ A02P 1/46
[52] U.S. Cl. ........................... 318/701; 318/254; 318/685
[58] Field of Search ................................. 318/701, 254, 318/685, 696

[56] References Cited

U.S. PATENT DOCUMENTS

| | | |
|---|---|---|
| 4,520,302 | 5/1985 | Hill et al. ............................ 318/696 |
| 4,611,157 | 9/1986 | Miller et al. ........................ 318/696 |
| 4,707,650 | 11/1987 | Bose ................................... 318/685 |
| 4,713,594 | 12/1987 | Bose et al. .......................... 318/685 |
| 4,933,620 | 6/1990 | Macminn et al. ................... 318/696 |
| 4,943,760 | 7/1990 | Byrne et al. ......................... 318/701 |
| 4,959,596 | 9/1990 | MacMinn et al. ................... 318/254 |
| 5,012,171 | 4/1991 | Sember ............................... 318/696 |
| 5,012,172 | 4/1991 | Sember ............................... 318/696 |
| 5,015,939 | 5/1991 | Konecny ............................. 318/701 |
| 5,023,924 | 6/1991 | Tajima et al. ....................... 318/254 |
| 5,204,604 | 4/1993 | Radun ................................. 318/701 |
| 5,298,841 | 3/1994 | Katayama et al. .................. 318/254 |
| 5,317,242 | 5/1994 | Kashima et al. .................... 318/254 |
| 5,469,039 | 11/1995 | Stephenson et al. ................ 318/701 |

FOREIGN PATENT DOCUMENTS

| | | | |
|---|---|---|---|
| 0534761A1 | 11/1992 | European Pat. Off. .......... H02P 7/00 |
| 0 534 761A1 | 3/1993 | European Pat. Off. .......... H02P 9/00 |
| 0 692 865 | 1/1996 | European Pat. Off. .......... H02P 7/05 |

OTHER PUBLICATIONS

Bose et al., *Microcomputer Control of Switched Reluctance Motor*, pp. 708–715, vol. IA-22 No. 2, Jul./Aug. 1986 IEEE Transactions on Industry Applications.

Orthman et al., *Turn-Off Angle Control of Switched Reluctance Motors for Optimum Torque Output*, pp. 20–25.

Stephenson and Blake, *The Characteristics, Design and Applications of Switched Reluctance Motors and Drives*, (Jun. 1993, Nuremberg, Germany).

Sugden, et al., *The Control of SR Drives: Review and Current Status*, pp. 35–40, EPE Aachen 1989.

Weller & Trawinski, *Design and Control of Low Power Switched Reluctance Motors (<1 kW)*, EPE Firenze 1991.

*Primary Examiner*—David S. Martin
*Attorney, Agent, or Firm*—Arnold, White & Durkee

[57] ABSTRACT

An electric motor controller is disclosed that controls the torque of a switched reluctance motor with an angle controller that eliminates the need for a look-up table. In one example, the electric motor controller includes an angle controller that employs edge-triggered monostables to generate a single pulse firing signal which is synchronized with rotor position and whose pulse length varies with torque demand. An angle firing circuit utilizing freewheeling is also disclosed.

19 Claims, 10 Drawing Sheets

ANGLE FIRING CONTROLLER AND METHOD OF CONTROLLING A SWITCHED RELUCTANCE MACHINE

FIELD OF THE INVENTION

This invention relates to variable speed electronic drives. More particularly, this invention relates to circuitry and a method for controlling a switched reluctance motor that eliminates the need for a control law table. The circuit and method of the present invention are applicable to all four quadrants of the torque/speed plane of operation.

BACKGROUND OF THE INVENTION

Electric motors turn electrical energy into mechanical energy to produce work. Electric motors work by applying a voltage across one or more inductors typically a machine winding, thereby energizing the inductor(s) to produce a resultant magnetic field. Mechanical forces of attraction or repulsion caused by the magnetic field cause a rotor in an electric motor to move. The efficiency of the electrical motor depends in part on the timing and magnitude of each application of voltage to the motor. Timing of the voltage being applied is particularly important in the case of switched reluctance motors.

Historically, the switched reluctance motor was thought to be incapable of competing effectively with other types of motors. More recently however, a better understanding of motor design and the application of electronically controlled switching has resulted in a robust switched reluctance drive capable of high levels of performance over a wide range of sizes, powers and speeds. Note that the term 'motor' is used here, but it will be appreciated by those skilled in the art that the term covers the same machine in a generating mode unless a particular distinction is made.

The switched reluctance motor is generally constructed without conductive windings or permanent magnets on the rotating part (called the rotor) and includes electronically-switched windings carrying unidirectional currents on the stationary part (called the stator). Commonly, pairs of diametrically opposed stator poles may be connected in series or parallel to form one phase of a potentially multi-phase switched reluctance motor. Motoring torque is developed by applying voltage to each of the phase windings in a predetermined sequence that is synchronized with the angular position of the rotor so that a magnetic force of attraction results between poles of the rotor and stator as they approach each other. Similarly, generating action is produced by positioning the voltage pulse in the part of the cycle where the poles are moving away from each other.

The general theory of design and operation of switched reluctance motors is well known and discussed, for example in *The Characteristics Design and Applications of Switched Reluctance Motors and Drives*, by Stephenson and Blake and presented at the PCIM '93 Conference and Exhibition at Nuremberg, Germany, Jun. 21–24, 1993.

There have been various strategies proposed in the past for controlling switched reluctance motors as part of an overall variable speed drive system. In general, these strategies may be divided into two broad groups: systems that employ current magnitude control over a fixed angle of rotor rotation, and systems that employ voltage control over varying angles of rotor rotation. The present invention is directed to systems that employ voltage control.

In general, "phase period" herein refers to the period between the rotor's position when a first rotor pole is completely aligned with the stator pole of interest and the rotor's position when an adjacent rotor pole is aligned with the stator pole. Depending on the number of rotor and stator poles there may be a number of phase periods for each complete rotation of the rotor.

Typically, systems that employ current magnitude control operate to control the torque of a switched reluctance motor by controlling the amplitude of the current in the phase winding during each phase period. In known switched reluctance motor systems, the motoring firing control is arranged such that the current in the phase windings drops to zero at or near the point where a rotor pole is completely aligned with the stator pole of interest. This is because current in the phase winding after the point where a rotor pole is aligned with the stator pole of interest can produce braking torque which is generally undesirable in motoring operation.

At standstill and at low speeds, the torque can be controlled by varying the current in the phase over the portion of the phase period during which the desired polarity of torque is produced. This can be achieved by chopping the current using a current reference with phase current feedback or by pulse width modulation (PWM) voltage control. These control strategies are generally understood and are described briefly below to aid the later description of the invention.

Figure 1:
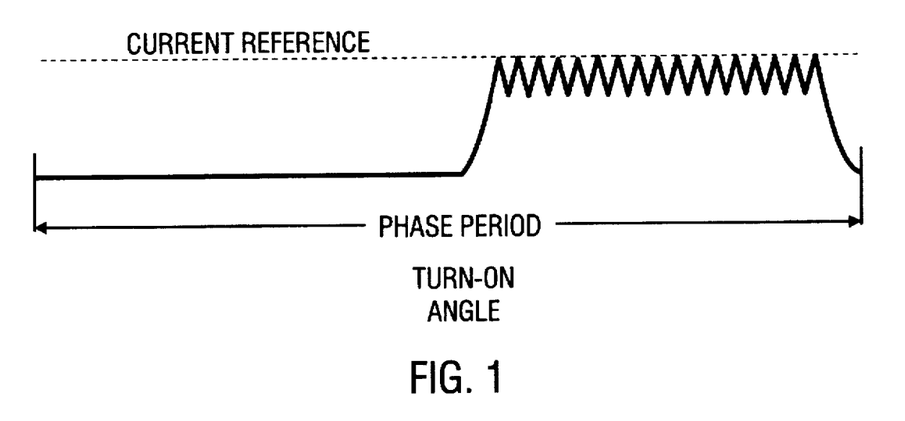
FIG. 1 generally illustrates a phase current of a switched reluctance motor when current chopping is used as a method of torque control.

FIG. 1 generally illustrates typical motoring phase winding current waveforms in the low speed region when chopping is used. As is illustrated in FIG. 1, the current increases until it reaches the current reference where it is chopped, i.e. prevented from increasing further, by the controller. It then decays to a lower control level whereupon the voltage is re-applied and the current rises again. This process repeats until the end of the phase period.

As the angular speed of the motor increases, a point is reached where there is insufficient time for more than a single pulse or "chop" of current to be produced during each phase period. Accordingly, at these speeds chopping strategies and pulse width modulation become ineffective. At these speeds, the torque of the motor is commonly controlled by controlling the position and duration of the voltage pulse applied to the winding during the phase period. Because a single pulse of voltage is applied during each phase period, this form of control is referred to as "single pulse control."

Figure 2:
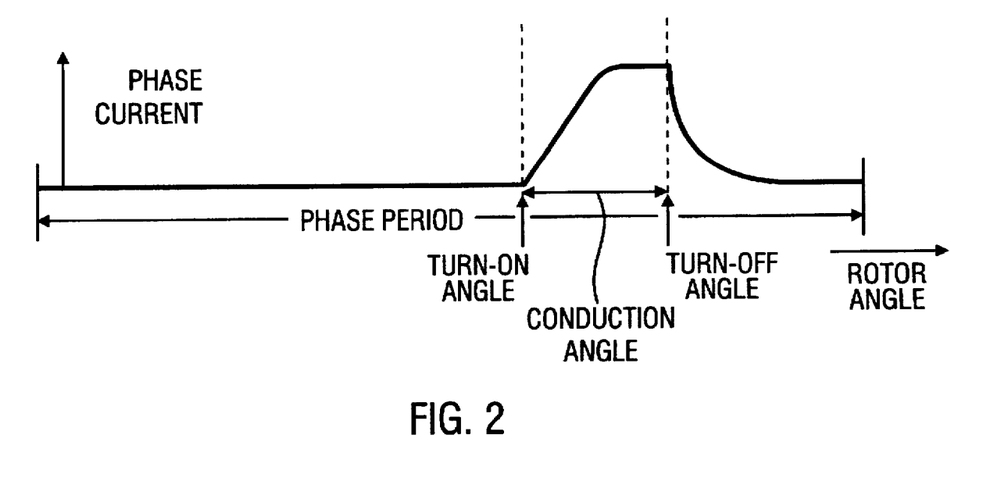
FIG. 2 illustrates an exemplary phase current waveform for a switched reluctance motor operating according to single pulse voltage control.

FIG. 2 illustrates an exemplary current waveform for a phase current in a motor operating according to single pulse control. In single pulse control, the torque level is defined by the magnitude and shape of the voltage pulse which, in turn, is generally determined by: the angular speed of the rotor; the point during the rotor's rotation when voltage is applied to the phase winding (referred to as the "turn-ON angle"); the point during the rotor's rotation when the application of voltage to the winding is halted (referred to as the "turn-OFF angle"); and the magnitude of the voltage applied to the phase winding. The turn-ON and turn-OFF angles define a "conduction angle." The conduction angle is the angular distance between the turn-ON and the turn-OFF angles. FIG. 2 generally illustrates the approximate positions of the turn-ON and turn-OFF angles and the duration of the conduction angle for the exemplary waveform.

The relationship between a required value of torque and the appropriate turn-ON and turn-OFF angles for each speed of the motor (assuming a constant DC link voltage) can not be defined accurately by any simple mathematical equation. In known switched reluctance motor systems, this complex relationship is typically implemented through the use of a circuit that stores signals representative of the relationship between the speed, torque demand and turn-ON and turn-OFF angles of the motor. Circuits of this type are commonly referred to as "control law tables."

In many known controllers for switched reluctance motors, the control law table comprises a circuit that includes turn-ON and turn-OFF angle information for various rotor speed and torque demand combinations. In most systems the information that is stored in the control law table is derived empirically through a process commonly known as "characterization" in which the appropriate turn-ON and turn-OFF angles required to produce the torque demand are determined for a number of different rotor speeds. The empirically derived information is then stored in the control-law table, sometimes together with information from non-tested speeds and torque demands which has been interpolated from the empirically derived information.

Figure 3:
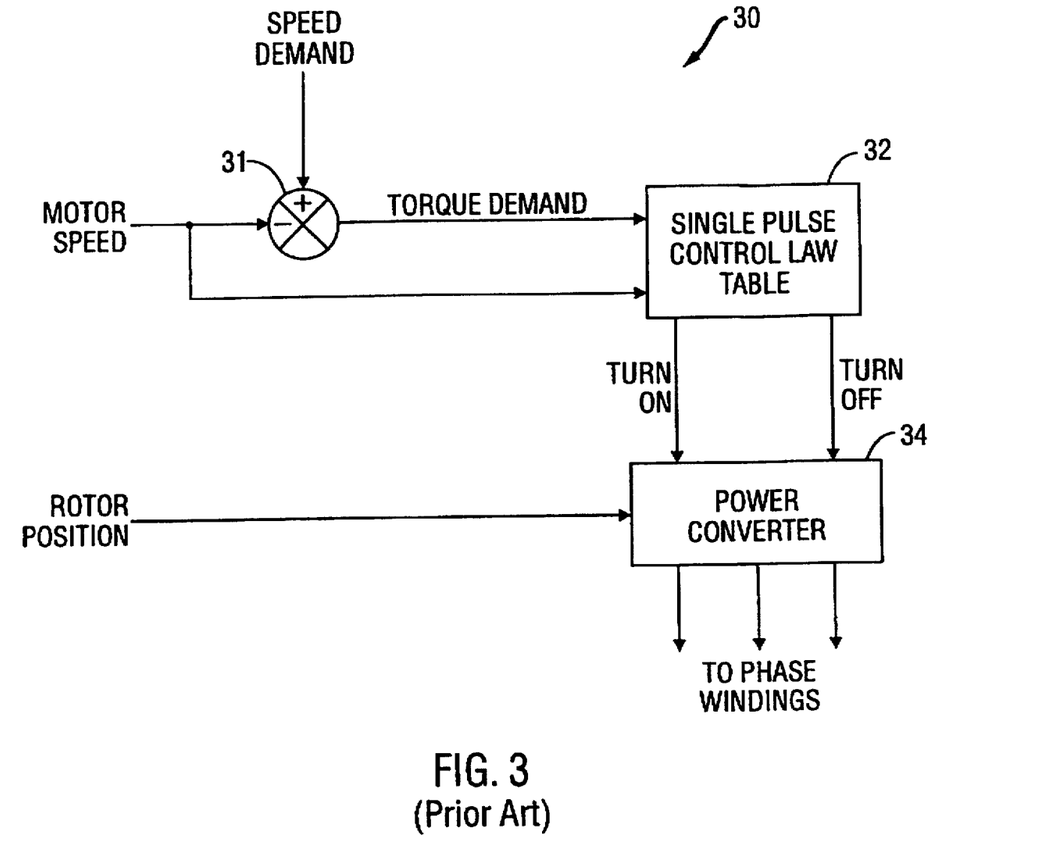
FIG. 3 illustrates in simplified block form an exemplary variable speed controller for a switched reluctance motor utilizing a control law table.

FIG. 3 illustrates in simplified block form an exemplary variable speed controller for single pulse control of the type using a control law table. As illustrated, the controller 30 receives a signal representative of the desired speed of the motor and compares it in an error detector 31 to a signal representing the actual speed of the motor. The output of the error detector 31 is an analog signal that varies linearly according to the difference between the desired speed and the actual speed and corresponds to the torque demand necessary to bring the motor to the desired speed.

The torque demand signal and the feedback command representing the angular speed of the rotor are provided to a circuit containing a control law table 32 which provides signals representative of the appropriate turn-ON and turn-OFF angles. The information concerning the appropriate conduction angle is provided to a power converter 34 that also receives a representation of the angular position of the rotor. The power converter 34 compares the signal representing the angular position of the rotor with the signals representing the appropriate turn-ON and turn-OFF angles and controls the power switching devices such that voltage is applied to the appropriate phase winding when the angular position of the rotor is equal to the desired turn-ON angle and removed from the phase winding when the rotor's position is equal to the turn-OFF angle. The structure and operation of controllers using control law tables is generally understood and is described, for example, in D. M. Sugden, P. D. Webster, J. M. Stephenson, "The Control of SR Drives: Review and Current Status," *Proceedings of the 3rd European Conference on Power Electronics Applications* (EPE '89) at Aachen, Germany, October 1989, pp. 35–40.

One disadvantage of controllers using control law tables is the necessity of providing for the control law circuitry. In particular, the digital memories commonly used to store the control law information are relatively expensive and add to the cost of the overall control system. Moreover, the use of control law tables adds to the cost and time required to develop a new control system in that the process of characterizing the motor may be required for each new motor and controller. A still further disadvantage of control law tables is that they suffer from discretisation. In other words, the control law table can store the conduction angle information for only a discrete number of speed/torque demand combinations. If the actual speed/torque demand combination is different from that contained in the control law table, the control system will typically provide the conduction angle information for the speed/torque demand point most near the actual speed/torque demand point. This results in the use of conduction angle information that is not necessarily optimal for each speed/torque demand point.

In the past, several approaches have been attempted to provide controllers for switched reluctance motors that do not rely on costly control law tables. As discussed below, most of the known alternatives to control law tables suffer from significant disadvantages.

For example, A. Weller and P. Trawinski propose a simplified angle controller in "Design and Control of Low Power Switched Reluctance Motors (<1 kW)"; *4th European Conference on Power Electronics and Applications* (EPE '91) at Florence, Italy, September 1991, pp. 1–7. In the proposed controller, the turn-ON and turn-OFF angles are programmed into a controller such that they vary with speed, but not torque. Because the torque information in this system is not considered in the generation of the conduction angle signals, the described control system will not provide continuously smooth operation over a wide operating range. Moreover, the disclosed system has the potential for speed loop instability.

Another alternative to the use of large, costly control law tables is disclosed in Bose et al., "Microcontroller Control of Switched Reluctance Motor", IA-22 *IEEE Trans. on Industry Applications*, pp. 708–715, July/August 1986. In the controller disclosed by Bose, a relatively small, coarse control law table is provided and the actual conduction angle information is computed in real-time through the use of interpolation. While this proposed alternative eliminates the need for a large, costly control law table, it does so at the expense of greatly increased computational power and complexity within the control system. Further, due to the additional time overhead associated with interpolation, such alternatives are unable to cope well with rapid changes in load torque and speed.

The present invention provides a circuit and a method for controlling a switched reluctance motor in the single pulse region without the use of large, costly control law tables and without the use of complex computational strategies. The present invention also provides a circuit and a method for controlling a switched reluctance machine that allows for smooth control of the output torque without the disadvantages of discretisation associated with control law tables.

SUMMARY OF THE INVENTION

The angle firing controller and method for controlling an electric motor of the present invention involves controlling the torque of a switched reluctance drive in the single-pulse mode while eliminating the use of a control law table.

In accordance with one embodiment of the present invention, the foregoing disadvantages of known switched reluctance motor controllers are overcome by employing an edge-triggered monostable circuit with an output having a pulse width which corresponds to the conduction angle and increases for increasing torque demand that is synchronized to actual rotor position. In this embodiment, the pulse width of the monostable that corresponds to the conduction angle is not controlled as a parameter from a control law table.

BRIEF DESCRIPTION OF THE DRAWINGS

Other aspects and advantages of the present invention will become apparent upon reading the following detailed description and upon reference to the drawings in which.

Similar reference characters indicate similar parts throughout the several views of the drawings.

DETAILED DESCRIPTION OF THE INVENTION

While the invention is susceptible to various modifications and alternative forms, a number of specific embodiments have been shown by way of example in the drawings and will be described in detail herein. It should be understood, however, that this is not intended to limit the invention to the particular forms disclosed. On the contrary, the intention is to cover all modifications, equivalents and alternatives falling within the spirit and scope of the invention as defined by the appended claims.

In contrast to known controllers for switched reluctance motors, the present invention eliminates the need for a large, costly control law table.

In general, the present invention implements a variable speed controller that receives a speed command signal and an actual speed signal, and produces a torque demand signal. The torque demand signal is then used to generate a conduction angle signal that represents the angular period over which voltage is to be applied to the appropriate phase winding. Information concerning the angular speed and position of the rotor is then used to set the turn-ON and turn-OFF angles such that the application of voltage to the phase winding occurs during the desired portion of the phase period.

For clarity, the following discussion is limited to a single-phase switched reluctance motor. As those skilled in the art will recognize, the present invention is also applicable to multi-phase switched reluctance machines, including switched reluctance motors. To apply the present invention to multi-phase machines it is simply necessary to add additional circuitry to identify the appropriate phase winding for energization during each phase period. Given the disclosure of the present invention contained herein, the construction of multi-phase switched reluctance machines embodying the present invention is within the ability of one of ordinary skill in the art and is not discussed in detail. Although the following description refers to reluctance motors, the present invention is applicable to reluctance generators and other reluctance machines.

Figure 4:
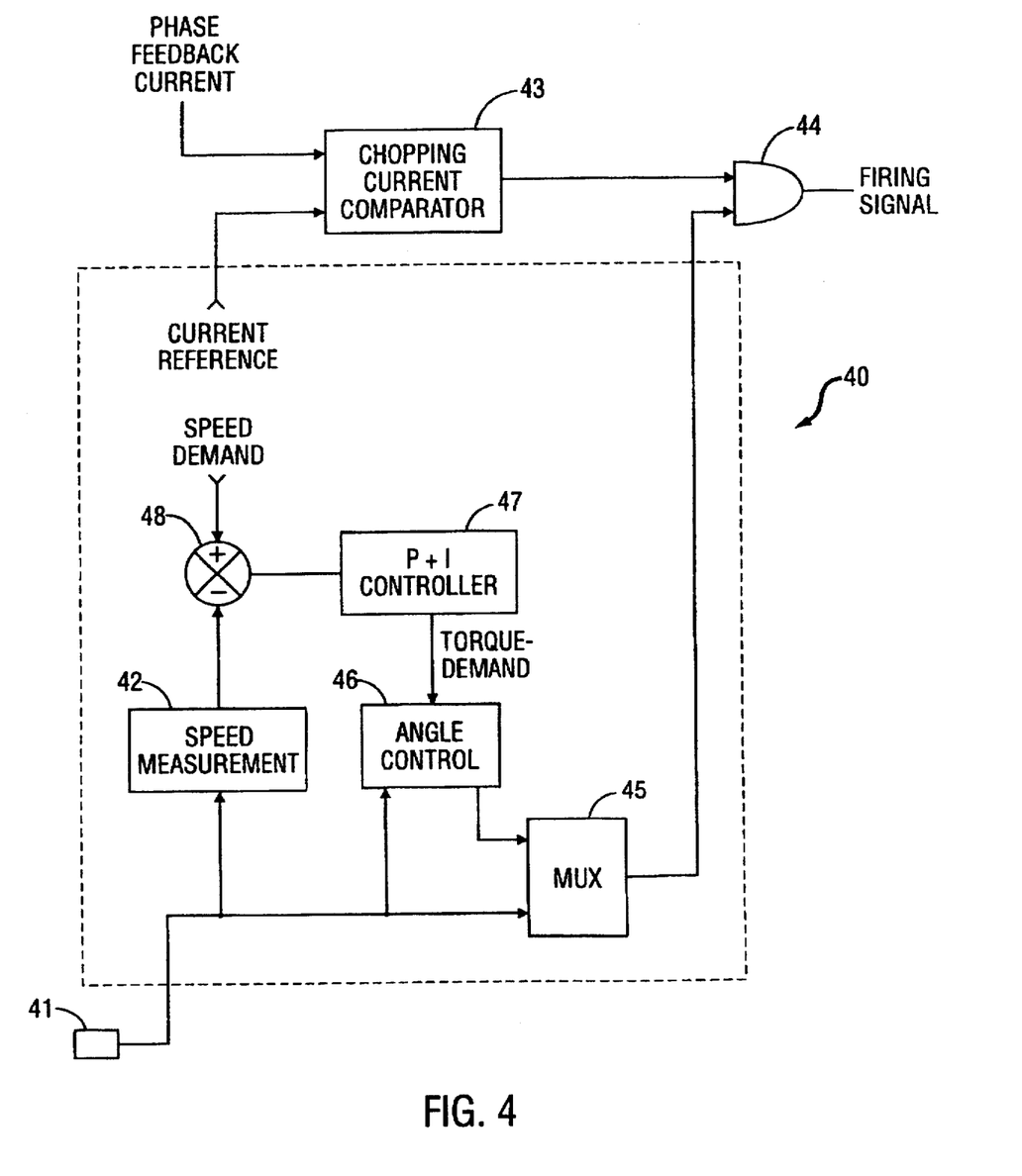
FIG. 4 illustrates in block form a variable speed controller for a single-phase switched reluctance motor constructed in accordance with the present invention.

FIG. 4 illustrates in block form a variable speed controller for a single-phase switched reluctance motor in accordance with the present invention. The controller of the present invention is applicable to many types of switched reluctance motors and the construction of the motor may be carried out in accordance with known methods and techniques.

The controller 40 includes a shaft sensor 41 for creating an output signal representative of rotor position. In the embodiment of FIG. 4, the shaft sensor 41 comprises a rotor position transducer (RPT) that produces voltage pulses having rising and falling edges that correspond to the angular position of the rotor over the phase period. For the single phase motor example of FIG. 4, shaft sensor 41 may be configured to produce voltage pulses having a 50% mark period where each falling edge indicates that a rotor pole is completely aligned with the stator pole of interest. The output of such an RPT is illustrated in FIG. 5.

Figure 5:
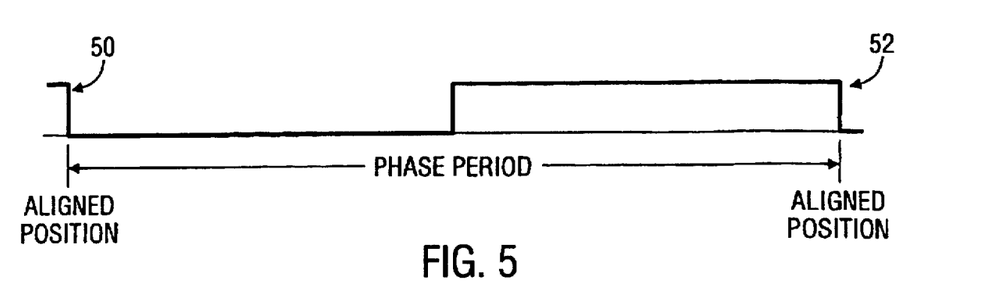
FIG. 5 illustrates the output of a rotor position transducer that may be used to implement the present invention.

FIG. 5 illustrates the output of the RPT that comprises shaft sensor 41 of FIG. 4 as a function of the rotor's position relative to the stator pole of interest. The RPT that comprises shaft sensor 41 is configured such that a first falling edge 50 occurs when a rotor pole is completely aligned with the stator pole of interest and a second falling edge 52 occurs when an adjacent rotor pole is aligned with the stator pole of interest. In the embodiment of FIG. 4, the RPT is configured such that the relationship of the mark region (the logic high region) to the space region (the logic low region) is near unity although this is not necessary for operation of the circuit. Embodiments are envisioned wherein the relationship of the mark region to the space region is different from that illustrated in FIG. 4. As indicated on FIG. 5, the period between each falling edge defines a "phase period." In the embodiment of FIG. 4, the circuitry is edge-triggered and hence does not primarily rely on the width of the pulse but on the edges that define the phase period.

It should be appreciated that the RPT that comprises shaft sensor 41 of FIG. 4 is but one example of a number of shaft sensors that may be used to implement the present invention. For example, shaft sensors or resolvers that provide digital signals representative of the actual position of the rotor may be used, and RPTs configured to produce voltage pulses with different rising or falling edge points may also be used. The present invention is not limited to sensors of the type described above but is applicable to a number of different types of rotor position sensors by which rotor position information can be derived. This includes the so-called 'sensorless' techniques in which the information is derived from, for example, the currents, voltages and/or inductances associated with the phase windings of the machine.

Referring back to FIG. 4, the controller 40 of the present invention also includes a speed measurement block 42 that receives the output of the shaft sensor 41. The speed measurement block 42 monitors the number of changes in the rotor position signal from the shaft sensor 41 over a predetermined period of time to produce a signal that corresponds to the angular speed of the rotor. In one embodiment, the output of the speed measurement block 42 is a digital word corresponding to the average rotor speed over a given period of time. Alternate embodiments are envisioned where the output of the speed measurement block 42 is an analog signal that varies in proportion to the rotor's speed. The use of a speed measurement circuit that operates from the output of the shaft sensor 41 is not essential to the present invention and other forms of speed sensing circuits (such as tachogenerators or the like) can be used without departing from the scope and spirit of the present invention.

As discussed above, at low speeds, current chopping may be used to control the torque of a switched reluctance motor. FIG. 4 illustrates one example of a chopping circuit that may be used in a controller constructed in accordance with the present invention.

Referring to FIG. 4, a chopping current comparator 43 is provided that receives a signal representative of a desired reference current and a feedback signal representative of the actual current in the phase winding of the motor. The chopping current comparator 43 produces a logic signal of a first logic level (e.g., logic high or "1") whenever the desired reference current exceeds the actual current, and a logic level of a second level (e.g., logic low or "0") otherwise. The output of the chopping comparator 43 is provided as a first input to AND gate 44. In the illustrated embodiment, AND gate 44 provides a firing signal commanding a power converter (not shown) to apply voltage to the appropriate phase winding whenever both of its inputs are logic high.

In the embodiment of FIG. 4 the second input to AND gate 44 is the output of a multiplexer 45. Multiplexer 45 receives two input signals and one control signal (not shown). The input signals comprise the output of the shaft sensor 41 and the output of angle control circuitry 46. The control signal comprises a signal derived from the output of the speed measurement block 42.

When the output of the speed measurement block 42 indicates that the motor is operating at a low speed, such that chopping can be used to control the motor's torque, the control signal applied to multiplexer 45 will be such that its output is the output of shaft sensor 41. At these low speeds, the current chopping comparator 43 operates as a standard current chopper to control the current in the motor.

In embodiments where the current chopping comparator 43 will be used to implement torque control through current chopping at low speeds, the current chopping comparator 43 may be a single discrete IC comparator and the current reference signal may be generated by a standard control circuit or derived by lowpass filtering a PWM signal from an ASIC or microcontroller.

At higher speeds, when single pulse control is necessary, the control signal applied to multiplexer 45 will be such that its output follows the output of angle control circuit 46. As discussed below, the angle control circuit 46 allows for single pulse control of the motor without the use of a control law table.

When single pulse voltage control is used, the current chopping comparator 43 may be used to implement an overcurrent protection function. To implement such an overcurrent protection function the current reference should be set to the maximum acceptable phase current. When the current reference is set to such a high value, the output comparator 43 will be logic high during normal operation such that the firing signal provided by AND gate 44 will follow the output of multiplexer 45 (i.e., the output of the angle control circuit 46). When comparator 43 is used as an overcurrent protection circuit, firing signals from AND gate 44 will be inhibited whenever the actual motor current exceeds the maximum acceptable current as defined by the current reference signal.

As discussed above, when the speed of the rotor as indicated by the output of speed measurement circuit 42 indicates that single pulse control is necessary, the signals that control the firing of the power devices are generated by angle control circuit 46 in response to a torque demand signal.

In the present invention, the torque demand signal is generated through the use of a compensator, for example, a proportional plus integral controller 47, that receives a speed error signal that varies with the difference between the actual rotor speed (as indicated by the output of speed measurement block 42) and a desired speed command signal provided to the controller.

Referring to FIG. 4, the circuitry generates a speed error signal by comparing the actual speed of the rotor with the desired speed in a error detector 48 to produce a speed error signal that varies in proportion to the difference between the actual rotor speed and the desired speed.

The P+I controller 47 converts the speed error signal to a torque demand signal through the application of known P+I control techniques. The values for the proportional and integral components of the P+I controller 47 may be determined empirically such that the controller operates stably over the expected operating speeds, or may be calculated using standard P+I control theory. The specific values of the proportional and integral components of the P+I controller 47 are not critical to the present invention.

The output of the P+I controller 47 is a torque demand signal that is applied as one input to the angle control circuit 46. The other input to the angle control circuit 46 is the output of the shaft sensor 41. In response to the torque demand signal and the output of the shaft sensor 41, the angle control circuit 46 generates firing signals when the controller is operating in the single pulse control mode.

Figure 6:
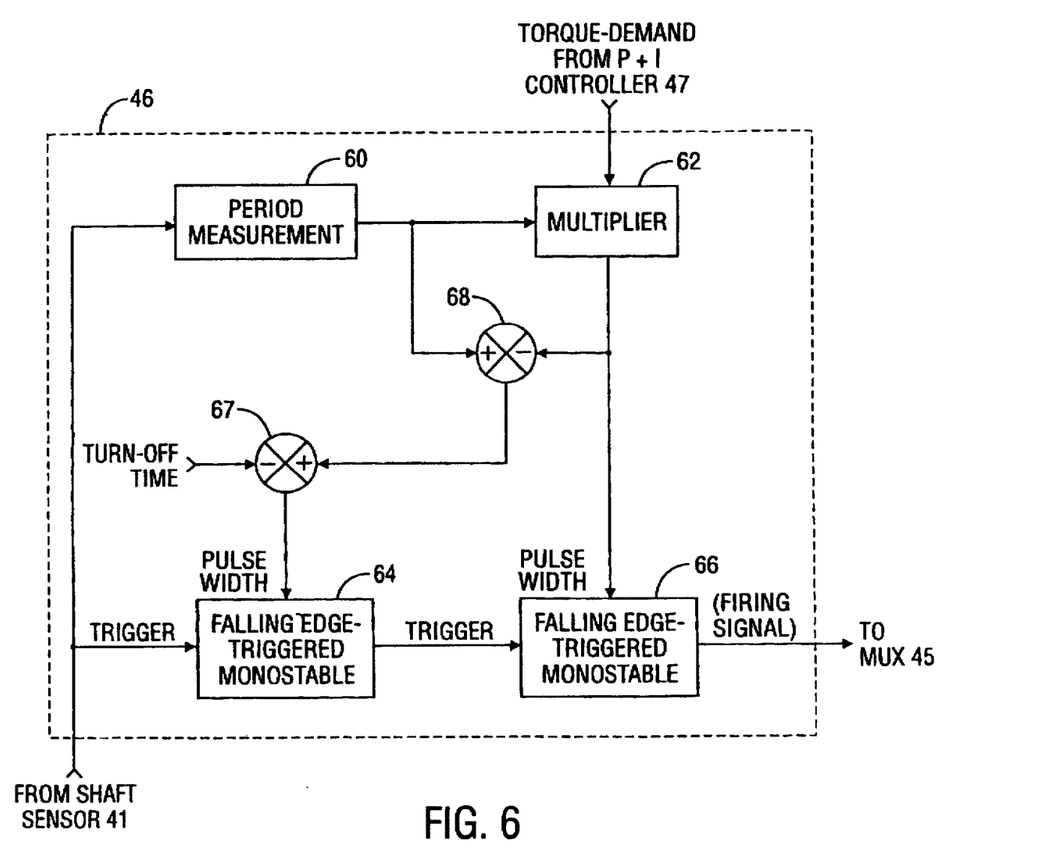
FIG. 6 illustrates the operational blocks and characteristics of an angle controller constructed in accordance with the present invention.

The structure and operation of the angle control circuit 46 is more clearly illustrated in FIG. 6. FIG. 6 discloses a circuit including a period measurement block 60, a multiplier 62, a first edge-triggered monostable 64, a second edge-triggered monostable 66 and two summing circuits 67 and 68. It should be understood that FIG. 6 illustrates the general operational blocks and characteristics of a controller constructed in accordance with the present invention and that an actual controller may use either analog or digital circuitry to perform the functions represented by the blocks of FIG. 6.

Referring to FIG. 6, the period measurement block 60 receives the output of the shaft sensor 41 and generates a signal that varies in proportion to the length of time between, for example, successive falling edges of the output of shaft sensor 41 (i.e., the length of time of the phase period). The signal produced by the period measurement block 60 is therefore a signal that corresponds to the interval of time required for one phase period.

As discussed above, in single pulse control, a single pulse of voltage is applied to the phase winding for the duration of the conduction angle in each phase period. In the present embodiment, the conduction angle is determined by the period of time over which the firing signal is present. In general, a longer firing signal provided during a phase period (i.e., a greater conduction angle), results in greater torque. Accordingly, the greater the torque demand signal, the greater the conduction angle and the longer the duration of the firing signal.

In the angle control circuit 46 illustrated in FIG. 6, the duration of the firing signal (i.e. the conduction angle) is determined by multiplying the signal corresponding to the length of time of the phase period from block 60 by the torque demand signal from P+I controller 47. Accordingly, the duration of the firing signal is approximately linearly proportional to the torque demand signal. In the embodiment of FIG. 4 the P+I controller 47 is configured such that its output is a signal having a value between 0 and 0.5 where 0.5 represents 100% torque demand. Alternate embodiments are envisioned, where the output of P+I controller has different values.

In the embodiment of FIGS. 4 and 6, when the torque demand signal is maximum, the output of multiplier 62 will be a signal representing a time interval one-half that of the time interval required for a complete phase period. The output of multiplier 62 may be limited to half of the phase period because one-half the phase period represents the theoretical maximum conduction angle that will allow the phase current to drop to zero during the phase period. As the torque demand signal decreases the output of multiplier 62 will correspond to a time interval that is some fraction of the time interval required for a complete phase period.

The output of multiplier 62 is applied to the PULSE WIDTH input of edge-triggered monostable 66. Edge-triggered monostable 66 is configured such that it produces a logic high voltage pulse for a time interval proportional to the value of the PULSE WIDTH signal in response to a falling edge occurring at its TRIGGER input.

The TRIGGER input to edge-triggered monostable 66 is coupled to the output of edge-triggered monostable 64. Edge-triggered monostable 64, like monostable 66, produces a logic high pulse for a time interval proportional to the value of the signal at its PULSE WIDTH input in response to a falling edge occurring at its TRIGGER input.

As illustrated in FIG. 6, the TRIGGER input to edge-triggered monostable 64 is coupled to the output of shaft sensor 41. As discussed above, shaft sensor 41 generates a falling edge at the initiation of each phase period. A falling edge from shaft sensor 41 will cause monostable 64 to generate voltage pulse terminating with a falling edge that occurs sometime after the falling edge from shaft sensor 41. The time interval between the initiation of the phase period (defined by the falling edge shaft sensor 41) and the falling edge output from monostable 64 will be proportional to the signal on the PULSE WIDTH input of monostable 64. In response to the falling edge output from monostable 64, monostable 66 will produce an output firing pulse proportional to the signal at its PULSE WIDTH input (which is proportional to the torque demand signal from P+I controller 47).

In the embodiments of FIGS. 4 and 6 the PULSE WIDTH signal of edge-triggered monostable 64 is generated by summers 67 and 68. The length of time between the point the firing angle pulse from monostable 66 is terminated and the point representing the end of the phase period is referred to herein as the TURN-OFF time. In the embodiments of FIGS. 4 and 6, a signal corresponding to the TURN-OFF time is subtracted by summer 67 from a second signal corresponding to the difference between the signal representing the duration of the phase period from block 60 and the signal representing the time interval of the conduction angle from multiplier 62. The output of summer 67 represents the time interval between the initiation of the phase period (defined by a falling edge from shaft sensor 41) and the initiation of the firing signal from monostable 66.

In the embodiment of FIGS. 4 and 6, TURN-OFF time may be calculated or empirically determined for optimum performance of the drive. Embodiments are envisioned where the TURN-OFF time is not constant but varies with the angular speed of the rotor. Still further embodiments are envisioned where the TURN-OFF time is a constant fraction of the phase period. In such an embodiment, a scaled signal corresponding to the fraction of the phase period would be multiplied by the signal representing the phase period to produce a value that could then be used as the TURN-OFF signal of FIGS. 4 and 6.

Figure 7A:
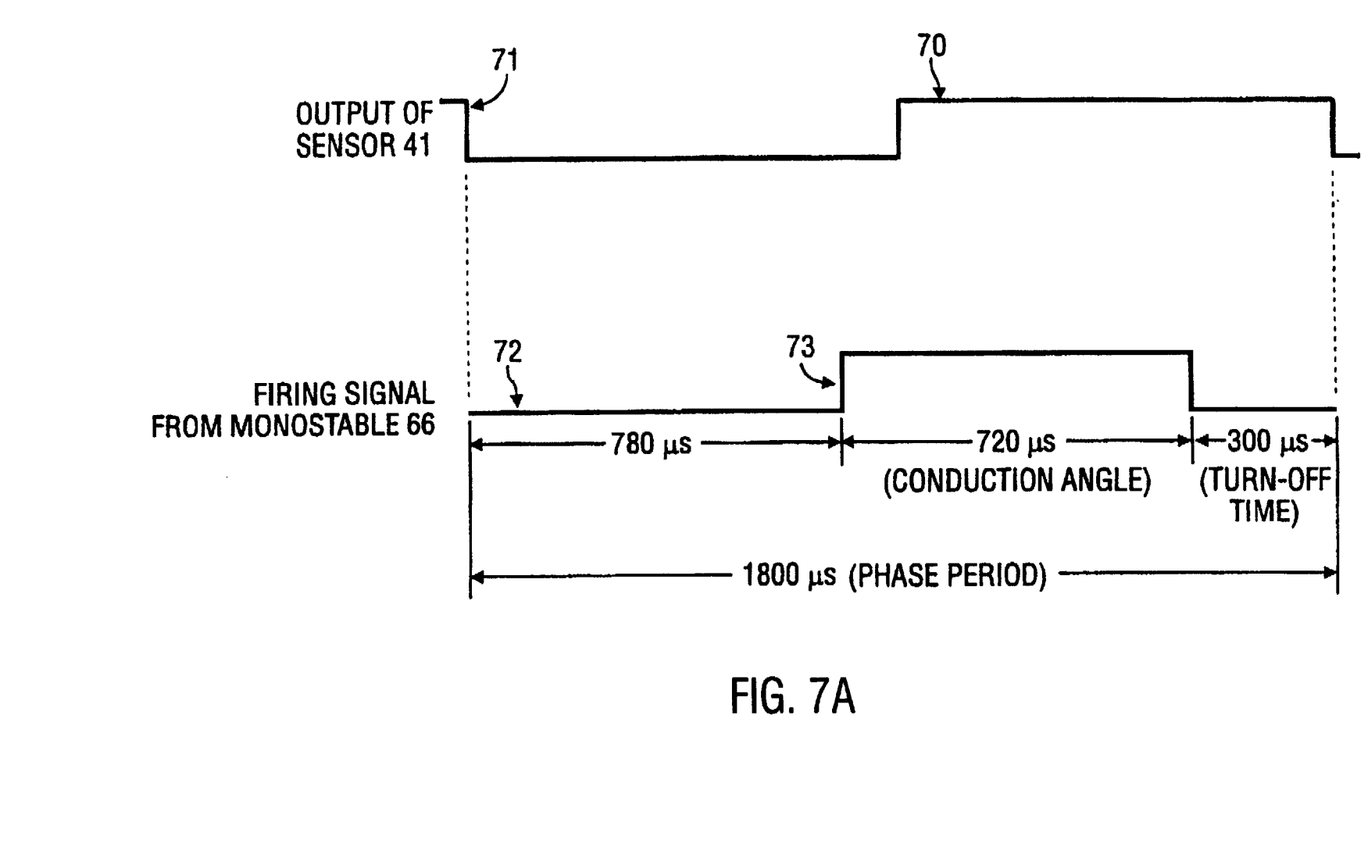
FIGS. 7a and 7b illustrate signals and signal levels for an exemplary operational state of the angle controller of FIG. 6.
Figure 7B:
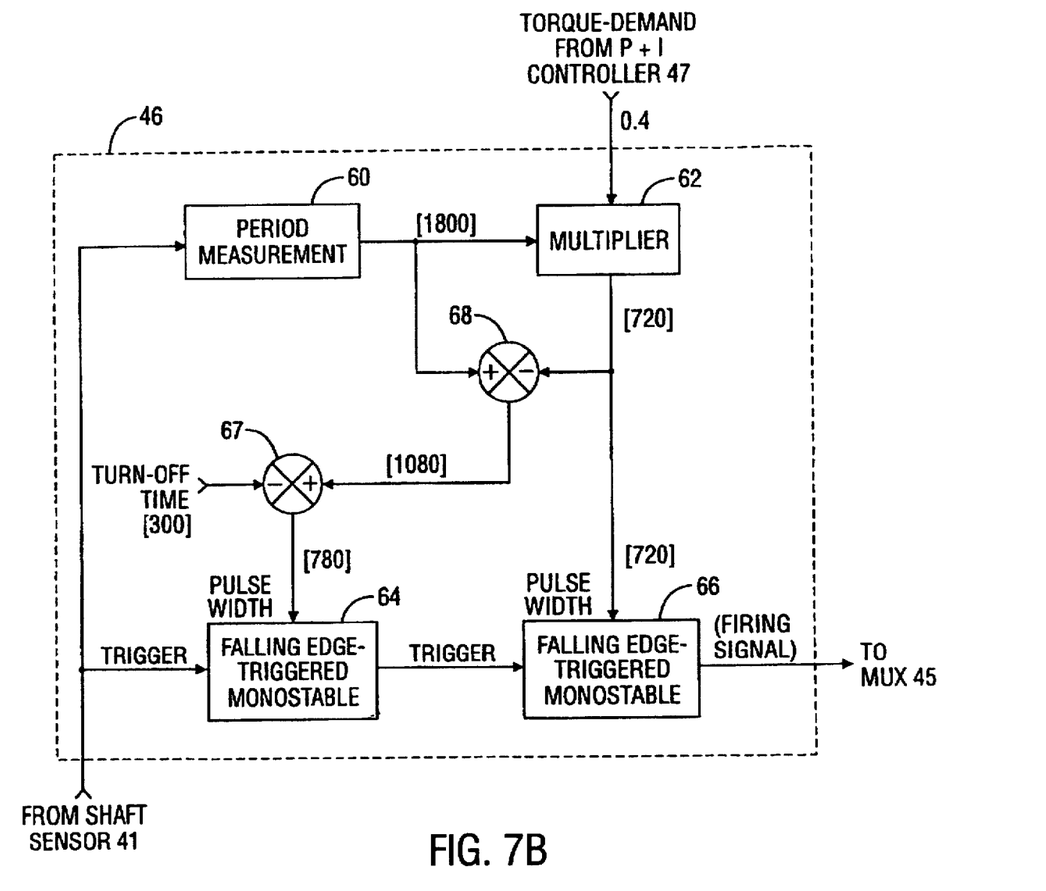

FIGS. 7a and 7b illustrate various signals and signal levels that may be used to explain the operation of the circuitry of FIGS. 4 and 6 when the rotor is rotating at a constant speed and the scaled torque demand signal is 0.4. In FIG. 7b the time intervals (in microseconds) corresponding to the signals in the circuit are delineated by brackets [].

Waveform 70 in FIG. 7a represents the output of shaft sensor 41. In the example illustrated in FIG. 7a it is assumed that the rotor is rotating at a constant speed of approximately 16,600 revolutions per minute and that the phase period defined by the falling edges of waveform 70 occurs over a time interval of 1800 microseconds. Accordingly, in the example corresponding to FIGS. 7a and 7b, the output of period measurement block 60 will be a signal corresponding to 1800 microseconds. This is illustrated in FIG. 7b where the output of period measurement block 60 is 1800. In the present example, the scaled torque demand signal has a value of 0.4. Accordingly, the output of multiplier 62 will be 720 which corresponds to (0.4*1800) and indicates that for the rotor speed and torque demand of the example, the firing signal should be generated for a period of 720 microseconds. In other words, the conduction angle corresponds to a time interval of 720 microseconds.

Having determined the length of the firing signal (or the conduction angle) the control circuit in the present example must then determine when in the phase period to initiate the firing signal such that it terminates at a point where the length of time between the termination of the firing signal and the end of the phase period is equal to the TURN-OFF time. This is accomplished through the use of summers 67 and 68. In the present example it is assumed that the desired TURN-OFF time is 300 microseconds. Referring to the example of FIG. 7b and performing the necessary subtraction operations, the PULSE WIDTH signal for monostable 64 is 780 which corresponds to a 780 microsecond delay between the initiation of the phase period and the initiation of the firing signal.

Waveform 72 in FIG. 7a illustrates the firing signal from monostable 66 for the previous example. Referring to waveform 70, the initiation of the phase period is indicated by the falling edge 71. Falling edge 71 triggers monostable 64 which will produce a pulse having a falling edge that occurs 780 microseconds after the initiation of the phase period. The falling edge generated by monostable 64 will trigger monostable 66 which will produce a signal (that is the firing signal) for 720 microseconds. The initiation of the firing signal is represented by rising edge 73 of waveform 72 in FIG. 7a. Because the PULSE WIDTH input to monostable 66 corresponds to a conduction angle period of 720 microseconds, the firing signal terminates after 720 microseconds, 300 microseconds before the conclusion of the 1800 microsecond phase period. As indicated above, in this example 300 microseconds is the desired TURN-OFF time.

While FIGS. 4, 6, and 7a and 7b illustrate the use of discrete summers, monostables and other circuits, the present invention may be implemented in a controller that uses one or more ASICs, microcontrollers or microprocessors. For example, all of the circuitry contained in the dashed box of FIG. 4 may be implemented in a single microcontroller, such as the Motorola 68HC11 through hardware and software. In such an embodiment, the on-chip timer port of the microcontroller (Port A) can be programmed to act as the firing signal edge-triggered monostables 64 and 66 and as the multiplexer 20.

When a Motorola microcontroller is used, the phase period measurement function of block 60 may be accomplished through the use of the input capture function of the timer port. The turn-ON time and the conduction time can be computed and loaded into the timer port to effect monostable performance. To avoid numeric overflow in the digital system, the phase period and the torque demand signals should be scaled so that the maximum scaled result of the multiplication is half of the actual phase period. As discussed above, this scaling ensures that the conduction angle is limited to the theoretical maximum continuous/discontinuous current boundary condition and may be done in software.

When a microcontroller is used, the P+I controller 47 may be implemented solely in software where the speed error is computed at a fixed time interval, set by a microcontroller fixed time interrupt, and a proportional plus integral algorithm is applied to the speed error on a periodic basis to update the torque demand.

The development of a software routine to implement the method and circuits of the present invention on a microprocessor or microcontroller will be within the ability of one of ordinary skill in the art having the benefit of this disclosure.

In addition to single pulse control where the application of a single voltage pulse is defined by a conduction angle which is defined by a turn-ON and turn-OFF angle, the present invention may be used to implement a controller where the single current pulse is defined by a turn-ON angle, a freewheel angle, and a turn-OFF angle.

As those skilled in the art will appreciate, when freewheeling is used there are generally two switching devices associated with a phase winding and each phase period can be divided into: (i) intervals when no voltage is applied to the phase winding (i.e., both power switches are off and the return diodes are nonconducting); (ii) intervals when the DC link voltage is applied to the phase winding (i.e., both power devices are on); (iii) intervals when the current in the phase winding is allowed to "freewheel" through one of the switches and one of the diodes (i.e., one power device is on and one diode is conducting); and (iv) intervals when the negative of the available DC voltage is applied to the phase winding (i.e., both power switches are off and the return diodes are conducting).

Figure 8A:
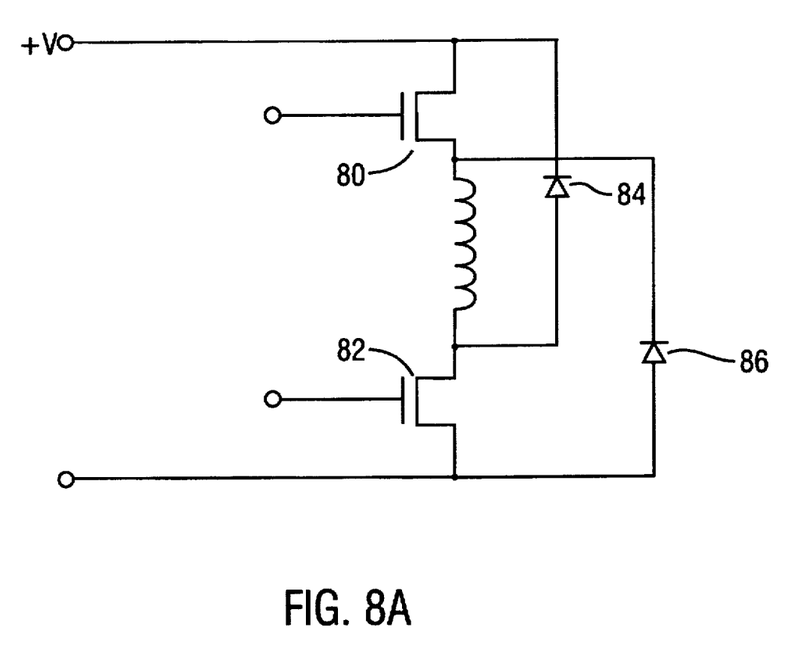
FIGS. 8a and 8b illustrate power circuitry and the control signals that may be used to implement freewheeling in an angle controller constructed in accordance with the present invention.
Figure 8B:
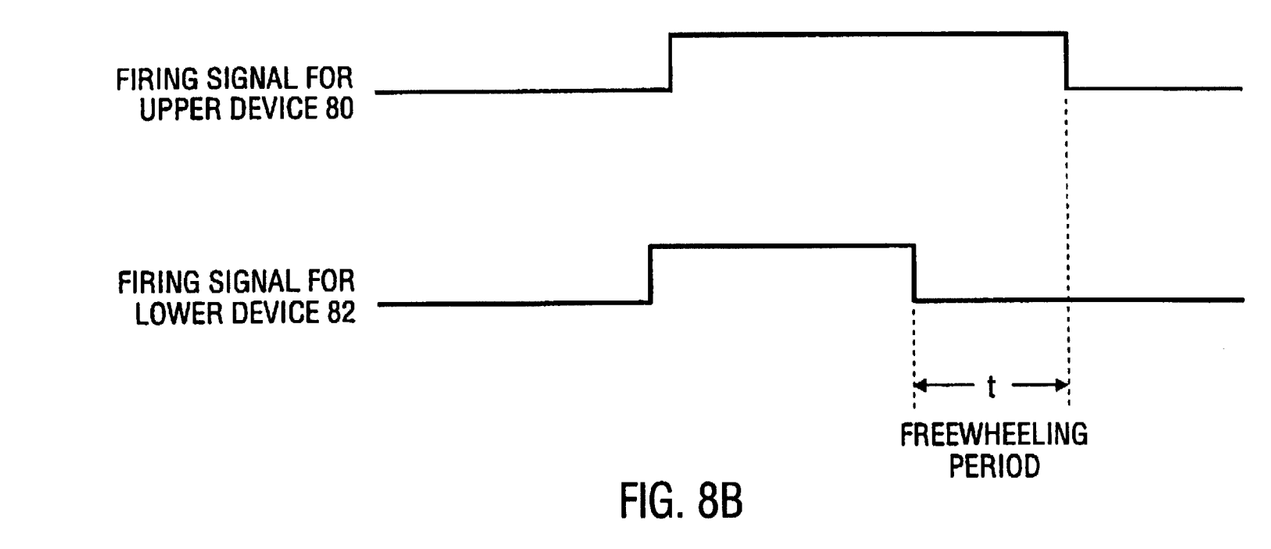

A typical circuit arrangement for implementing freewheeling, and typical control signals from such a circuit are illustrated in FIGS. 8a and 8b. In a freewheeling arrangement there are typically two power devices, upper device 80 and lower device 82. There are also two return diodes 84 and 86 associated with each phase winding. FIG. 8b illustrates the firing signals for the switching devices 80 and 82 over a phase period in which freewheeling is employed. As indicated in FIG. 8b there is an initial period when both switching devices are on and the available DC link voltage is applied to the phase winding. There is then a "freewheeling" period where one of the switching devices (here device 82) is turned off and a period when both devices are turned off. In the freewheeling period, the current freewheels around the loop formed by device 80, diode 84 and the phase winding.

Figure 9A:
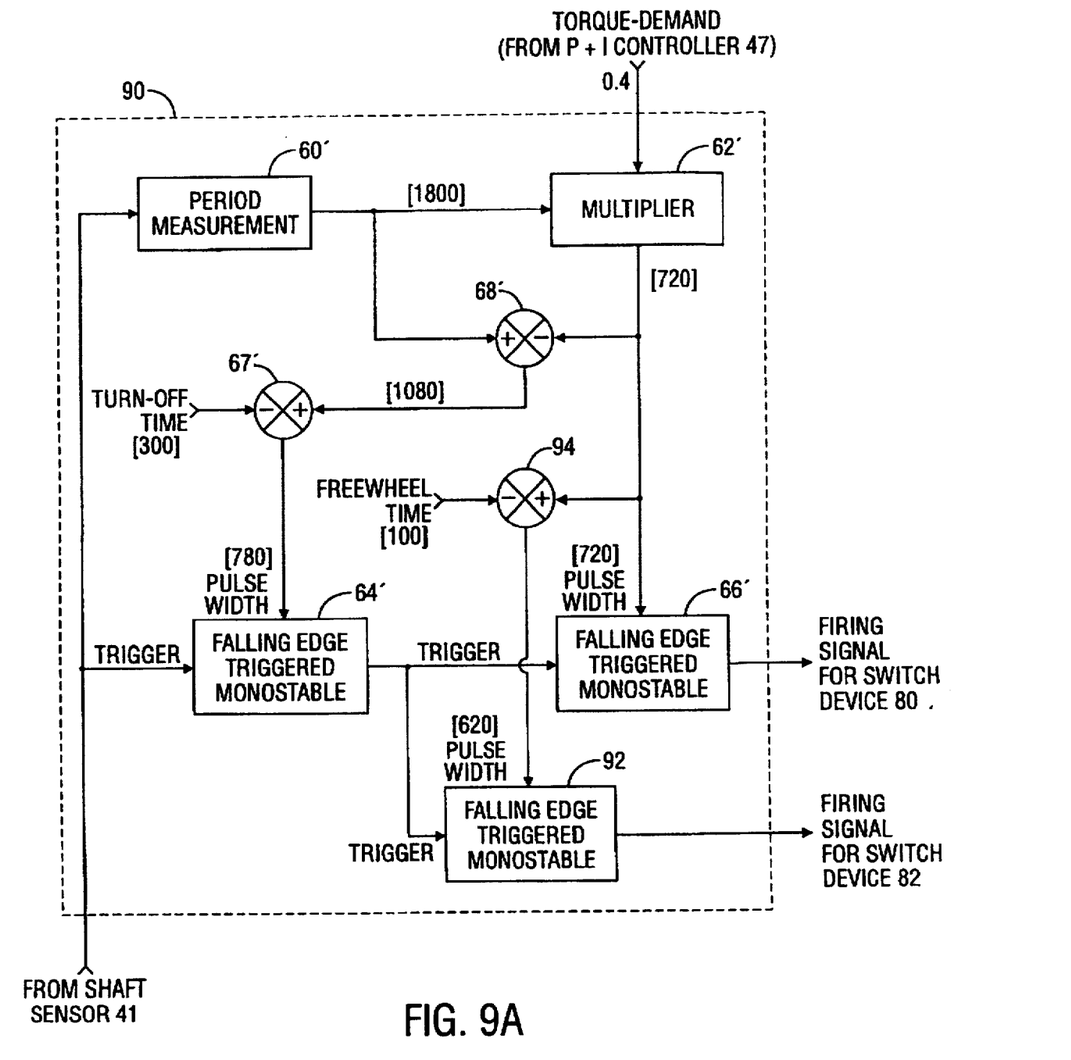
FIGS. 9a and 9b illustrate an angle control circuit and exemplary signals and signal levels for a freewheeling angle controller constructed and operated according to the present invention.
Figure 9B:
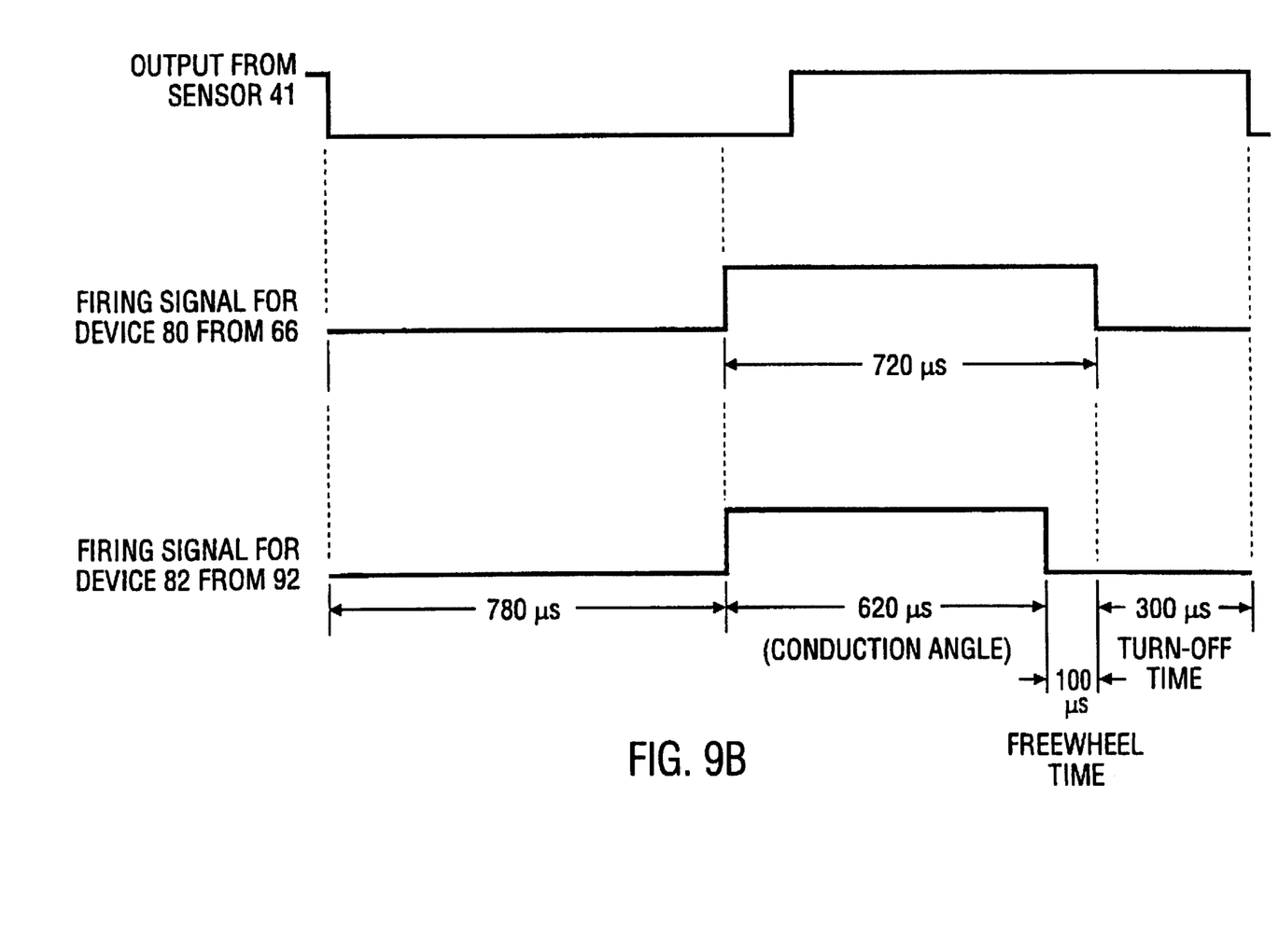

FIGS. 9a and 9b illustrate one example of an angle controller 90 in accordance with the present invention that may utilize freewheeling. The controller of FIG. 9a is similar to the controller of FIG. 4 with the major exception being the addition of an additional edge-triggered monostable 92 and an additional summer 94. The additional edge-triggered monostable 92 and summer 94 produce a separate firing signal for the lower switching device 82. In this embodiment of FIG. 9a, a signal corresponding to the time duration of the desired freewheeling period is applied as one input to the summer 94. This value is subtracted from the signal representing the time interval of the desired conduction angle to produce the PULSE WIDTH signal for monostable 92. In a manner similar to that described above in connection with the circuitry of FIG. 4, the summer 94 and edge-triggered monostable 92 will control the lower switching device 82 to enable freewheeling.

The signals that will be generated by the controller of FIG. 9a for an example of a motor operating with a phase period of 1800 microseconds, a turn-off time of 300 microseconds and a scaled torque demand of 0.4, and a freewheeling period of 100 microseconds, are illustrated in FIGS. 9a and 9b through the use of brackets as was done with FIGS. 7a and 7b.

In the embodiment of FIG. 9a the freewheel time is a fixed value that is selected to minimize acoustic noise of the controller and motor system. In this embodiment, the freewheel time may be selected based on the natural resonance of the switched reluctance motor or may be determined empirically by adjusting the freewheel time and monitoring the acoustic noise of the system to determine the free-wheel time that produces the least acoustic noise. Alternate embodiments are envisioned where the free-wheeling time is controllable and varies, for example, with the speed of the motor or other operating parameters. Still further embodiments are envisioned wherein the switching device used to initiate freewheeling alternates between the upper and the lower devices. Alternate freewheeling has been used in the past to equalize the thermal losses between the power devices and to ease the design of the controller. This technique may be implemented by feeding the two firing signals of FIG. 9(a) to a multiplexer or similar device to alternately feed the signals to the two switching devices.

The above examples and discussions address the operation of the controller of the present invention when the switched reluctance machine to which the controller is coupled is functioning as a motor. The controller of the present invention can also be used when the switched reluctance machine is acting as a generator. When the switched reluctance machine is acting as a generator, the timing of the control circuit should be triggered from an edge of the signal from shaft sensor 41 which corresponds to the inter-polar axis on the rotor being aligned with a stator pole. This can be conveniently achieved when a RPT with a unity mark:space ratio is utilized by using the rising edges of the RPT signal, as shown in FIG. 5. By triggering the circuit from an rising edge of shaft sensor 41, the control circuit may be used with a machine operating as a generator. Those skilled in the art will recognize that alternative methods of manipulating the RPT signals are possible, e.g., the pulse train could have half a period added to phase shift it, or the RPT could be moved on the rotor shaft by an appropriate angle. Accordingly, the control circuit of the present invention may be used in all four quadrants of machine operation.

While the invention has been described in connection with the illustrative embodiments discussed above, those skilled in the art will recognize that many variations may be made without departing from the present invention. Accordingly, the above description of several embodiments is made by way of example and not for purposes of limitation. The present invention is intended to be limited only by the spirit and scope of the following claims.

What is claimed is:

1. An angle firing control system for controlling, in a single-pulse mode, the torque of a switched reluctance machine including a rotor and a phase winding in response to a speed demand signal and a rotor position signal, the angle firing control system comprising:

a speed measurement circuit for receiving the rotor position signal and producing an output signal indicative of the angular speed of the rotor;

an error detector electrically coupled to the speed measurement circuit, the error detector receiving as inputs the signal indicative of the angular speed of the rotor and the speed demand signal, the error detector producing a speed error signal proportional to the difference between its inputs;

a controller coupled to receive the output of the error detector and to provide a torque demand signal;

an angle controller coupled to the output of the controller and coupled to receive the rotor position signal, the angle controller generating a firing pulse that is initiated based on the rotor position signal and that has a time duration proportional to the torque demand signal, wherein the time duration of the firing pulse is controlled by a timing device; and a power switching device coupled to the angular controller that couples the phase winding to a power supply for the duration of the firing pulse.

2. The angle firing control system of claim 1 wherein the controller is a proportional-plus-integral controller.

3. The control system of claim 1 wherein the angle controller comprises a microcontroller.

4. The control system of claim 1 wherein the angle controller comprises an application specific integrated circuit.

5. The control system of claim 1 wherein the angle controller comprises the timer port of a microcontroller.

6. A control system for controlling the torque of a switched reluctance machine including a rotor and a phase winding in response to a torque demand signal and a signal representative of the angular position of the rotor, the control system comprising:

a firing circuit that receives the torque demand signal and generates a firing signal with a duration that is approximately linearly proportional to the torque demand signal; wherein the firing circuit comprises:

a period measurement circuit that receives the signal representative of the angular position of the rotor and provides a signal representative of the phase period of the machine;

a multiplier coupled to the period measurement circuit that receives as inputs the torque demand signal and the signal representative of the phase period, wherein the multiplier multiplies the signal representative of the phase period by the torque demand signal to produce a conduction angle signal;

a first monostable electrically coupled to the multiplier, wherein the first monostable produces a firing signal that has a time duration proportional to the conduction angle signal and a power switching device electrically coupled to the firing circuit that electrically couples the phase winding to a power source for the duration of the firing, signal.

7. The control system of claim 6 wherein the signal representative of the angular position of the rotor has an edge that indicates the initiation of a phase period, wherein the first monostable is edge-triggered, and wherein the first monostable is triggered at a pre-determined time after the edge.

8. The control system of claim 7 wherein the firing circuit further comprises a second edge-triggered monostable that receives and is triggered by the signal representative of the angular position of the rotor, wherein the output of the second edge-triggered monostable is used to trigger the first monostable.

9. The control system of claim 6 wherein the firing circuit comprises microcontroller.

10. The control system of claim 6 wherein the firing circuit comprises an application specific integrated circuit.

11. The control system of claim 6 wherein the firing circuit comprises the timer port of a microcontroller.

12. An angle firing control system for controlling, in a single-pulse mode, the torque of a switched reluctance machine including a rotor and a phase winding in response to a speed demand signal and a rotor position signal, the angle firing control system comprising;

a speed measurement circuit for receiving the rotor position signal and producing an output signal indicative of the angular speed of the rotor;

an error detector electrically coupled to the speed measurement circuit, the error detector receiving as inputs the signal indicative of the angular speed of the rotor and the speed demand signal, the error detector producing a speed error signal proportional to the difference between its inputs;

a controller coupled to receive the output of the error detector and to provide a torque demand signal;

an angle controller coupled to receive the rotor position signal and coupled to the output of the controller, the angle controller generating a first set of switching signals that are initiated based on the rotor position signal and that have a duration proportional to the torque demand signal and a second set of signals that are initiated based on the rotor position signal and that have a predefined duration, wherein the durations of the first and second sets of signals are determined by a timing device, and first and second power switching devices coupled to the angular controller, wherein the first and second power switching devices couple the phase winding to a power supply for the duration of the first set of signals and wherein the first and second power switching devices allow the current in the phase winding to freewheel through the phase winding for the time duration of the second set of signals.

13. The angle firing control system of claim 12 wherein the controller is a proportional-plus-integral controller.

14. A control system for controlling the torque of a switched reluctance machine including a rotor and a phase winding in response to a torque demand signal and a signal representative of the angular position of the rotor, the phase winding defining a first terminal and a second terminal, the control system comprising:

a period measurement circuit that receives the signal representative of the angular position of the rotor and provides a signal representative of the phase period of the machine;

a multiplier coupled to the period measurement circuit that receives as inputs the torque demand signal and the signal representative of the phase period and multiplies the signal representative of the phase period by the torque demand signal to produce a conduction angle signal;

a first monostable coupled to receive at an input the conduction angle signal from the multiplier, wherein the first monostable produces at an output a first firing signal that has a time duration proportional to the conduction angle signal; and a first power switching device electrically coupled to receive the output of the first monostable wherein the first power switching device electrically couples the first terminal of the phase winding to an electric power source for the duration of the first firing signal.

15. The control system of claim 14 further comprising a second monostable that produces a second firing signal that has a predetermined time duration; and a second power switching device electrically coupled to the second monostable that electrically couples the second terminal of the phase winding to the electric power source for the duration of the second firing signal wherein the signal representative of the angular position of the rotor has an edge that indicates the initiation of a phase period, and wherein the first and second monostables are edge-triggered, and wherein the first and second monostables are triggered at a pre-determined time after the edge.

16. The control system of claim 15 wherein the firing circuit further comprises a third edge-triggered monostable that receives and is triggered by the signal representative of the angular position of the rotor, wherein the output of the third edge-triggered monostable is used to trigger the first and second monostables.

17. A control system for controlling the operation of a switched reluctance machine in a single-pulse mode, the switched reluctance machine including a rotor and a phase winding, the system comprising:

means for deriving a signal indicative of rotor position;

speed measurement means for producing a signal indicative of the angular speed of the rotor;

error detector means for receiving the signal indicative of the angular speed of the rotor and a speed demand signal, and for producing a speed error signal related to the difference between the signal indicative of the angular speed and the demand signal;

controller means responsive to the speed error signal and to the signal indicative of rotor position for generating an actuation signal, wherein the initiation of the actuation signal is synchronized with the signal indicative of the rotor position and has a duration related to the speed error signal, the duration of the actuation signal being determined by a timing device; and switch means responsive to the actuation signal from the controller for enabling energization of the winding.

18. A control system as claimed in claim 17 wherein the controller means comprises a first circuit which is operable to produce a torque demand signal related to the error signal, and a second circuit which is responsive to the torque demand signal to produce the actuation signal.

19. A control system as claimed in claim 24 wherein the controller means performs a proportional-plus-integral control function on the error signal to produce the torque demand signal.

* * * * *

UNITED STATES PATENT AND TRADEMARK OFFICE
CERTIFICATE OF CORRECTION

PATENT NO. : 5,789,893
DATED : August 4, 1998
INVENTOR(S) : Stephen J. Watkins

It is certified that error appears in the above-identified patent and that said Letters Patent is hereby corrected as shown below:

On the title page under [30] Foreign Application Priority Data, please correct the priority date of Apr. 3, 1995 to -- Apr. 4, 1995 – therefor.

Signed and Sealed this

Second Day of November, 1999

Attest:

Q. TODD DICKINSON

*Attesting Officer*     *Acting Commissioner of Patents and Trademarks*